United States Patent Office 3,544,971
Patented Dec. 1, 1970

1

3,544,971
DEVICE FOR AUTOMATICALLY DISPLAYING THE LOGIC ELEMENTS AND FOR AUTOMATICALLY CHANGING THEIR STATUS
Floyd W. Looschen, Arcadia, Calif., assignor to Burroughs Corporation, Detroit, Mich., a corporation of Michigan
Filed Feb. 21, 1968, Ser. No. 707,251
Int. Cl. G11c 7/00
U.S. Cl. 340—172.5                    28 Claims

ABSTRACT OF THE DISCLOSURE

A display device containing a plurality of incandescent lamps used to display the status of respective flip-flop circuits in any selected one of a plurality of discrete units within a data processing system. Silicon controlled rectifiers associated with respective ones of the lamps trigger their associated lamps to incandescence when concurrent data and word signals are provided to the rectifiers during a scan-out operation in which word groups of the flip-flop circuits are sequentially and automatically scanned. Push button switches are also associated with respective ones of the lamps and depression of one of these push buttons effects a halt of the scan-out operation when the word associated with the depressed button is scanned and initiates a scan-in operation in which the status of the flip-flop associated with the button is altered. An additional push button is utilized to indicate the status to which the designated flip-flop is to be changed and additional push button switches are utilized to initiate scan-in operations in which entire words of flip-flop circuits are cleared.

CROSS REFERENCE TO RELATED APPLICATION

Patent application of Kenneth C. Kwan and Jean A. De Beule, Ser. No. 694,897, filed on Jan. 2, 1968, and assigned to the assignee of the present invention.

BACKGROUND OF THE INVENTION

This invention relates to digital data processing systems and, more particularly, to apparatus for displaying information signals sequentially received from predetermined groups of logic elements within the system during a scan-out phase of operation. Additionally it provides for manuallly changing the status of the elements by initiating a scan-in phase of operation and by presenting altered information signals to the elements during the scan-in phase of operation.

Data processing systems conventionally indicate changes occurring within the system by means of print-out operations such as memory dump operations or by means of supervisory messages presented on a typewriter or cathode ray display device. Such operations, however, indicate changes within the system long after such changes have occurred. They are often suitable so long as the system is operating satisfactorily. They do not, however, enable a person to determine the particular changes in logic elements, such as flip-flop circuits, within the system which are effected during the execution of each micro operation executed within the system. Consequently, the information provided by such operations is somewhat general in nature and insufficient to indicate with any degree of specificity the source of any errors occurring during the operation of the system.

Such specific information has been provided in some prior art systems by means of direct connections between each flip-flop circuit within the system and display devices. Indicating devices such as lamps are mounted on the display devices and each lamp is connected, via conventional two-wire-per-element schemes, to a particular one of the flip-flop circuits. Additionally, a push button may be provided for each flip-flop circuit, thereby enabling the manual changing of status of the flip-flop circuits. As data processing systems have grown more complex, however, the number of flip-flop circuits within the various units of the system, and the number of units themselves, has increased greatly. Accordingly, the cost involved in providing a lamp assembly, push button, and wiring for every flip-flop circuit within a system has correspondingly increased and has become relatively expensive. Additionally, the provision of such a large quantity of lamps, push buttons and wiring requires the use of valuable space which might better be put to other purposes.

The copending patent application of Kwan and De Beule, referred to previously, discloses a data processing system which includes a unit having scan-in and scan-out matrices. These matrices are utilized to scan information into and out of particular flip-flop circuits in any selected one of a plurality of other units within the system. The unit including the matrices further includes a register which provides address information which designates a particular group of flip-flop circuits within the selected unit and includes a register which provides, or receives, data information scanned into, or scanned out of, the particular group of flip-flop circuits.

An advantage of the present invention is that it provides an improved display device for automatically displaying the status of flip-flop circuits within a digital data processing system.

Another advantage of the present invention is that it provides an improved display device for automatically displaying the status of flip-flop circuits within any selected one of a plurality of groups of flip-flop circuits within a digital processing system.

A further advantage of the present invention is that it provides an improved display device for displaying the status of flip-flop circuits within a digital data processing system without requiring direct connections between display elements and each of the flip-flop circuits.

Yet another advantage of the present invention is that it provides an improved device for automatically displaying the status of flip-flop circuits within a digital data processing system and provides manual push button switches for changing the status of the flip-flop circuits without requiring direct connections between the push button switches and each of the flip-flop circuits.

Still another advantage of the present invention is that it provides an improved display device which is more economical than previous means for both automatically displaying the status of flip-flop circuits within a digital data processing system and manually changing their status.

SUMMARY OF THE INVENTION

In brief, the preceding and additional advantages are achieved in a system wherein a display device is utilized in conjunction with scan-in and scan-out matrices of the type disclosed in the copending application of Kwan and De Beule referred to hereinbefore. The scan-in and scan-out matrices couple the display device to flip-flop circuits within a predetermined unit of the data processing system. The display device includes a plurality of lamps which may advantageously be arranged in rows and columns with each column associated with a particular word, or group, of flip-flop circuits within the predetermined unit of the data processing system. Each lamp within a column is associated with the flip-flop in a particular bit location within the word. Registers associated with the matrices present address signals to the display device indicative of a particular word and data signals indicative of the bits stored in the identified word.

The display device has a trigger device such as a silicon controlled rectifier associated with each lamp. Periodic recycle signals clear the displayed device by turning off all of the lamps of the display. Scan-out of data from the flip-flop circuits to the display device is accomplished by scanning the scan-out matrix, a word at a time, through all of the flip-flops. A recycle signal normally follows each complete scan-out of the flip-flops. As each word is scanned out, address signals indicative of the word being scanned and data signals indicative of the status of flip-flops in the scanned word are presented to the display device. Matrix means within the display utilize the address signals to select a particular column of lamps and the data signals trigger the silicon controlled rectifiers associated with the lamps in the selected column thereby causing the lamps of the particular column to display the contents of an associated word of flip-flop circuits. Consequently, at the end of each full scan-out operation the lamps of the display present a visual indication of the status of the flip-flops. The scan-out operation and recycle are alternately repeated so long as status display is desired.

Scan-in of data into the flip-flops is initiated by means of push buttons on the display unit which are respectively associated with the lamps. Depression of a push button causes a scan-in signal to be presented to control circuitry when the word associated with that button is scanned during the scan-out operation. The scan-in signal is effective to cause the scan-in matrix to execute a scan-in operation at this time. Data location lines indicate the bit location of the flip-flop to be altered during the scan-in operation and the condition of another push button indicates whether the flip-flop to be altered is to be set or reset.

Additional push buttons are provided, the depression of which effect scan-in operations which reset a particular one or more entire words of flip-flop circuits when the particular one or more words are scanned during the scan-out operation.

Additional control circuitry is provided to effect the selective freezing of data displayed in the display unit.

BRIEF DESCRIPTION OF THE DRAWINGS

The manner of operation of the present invention and the manner in which it achieves the above and other advantages may be more clearly understood by reference to the following detailed description when considered with the drawing in which:

FIGS. 3A and 3B, depicts a portion of the display unit of FIGS. 1 and 2;

DETAILED DESCRIPTION

Figure 1:
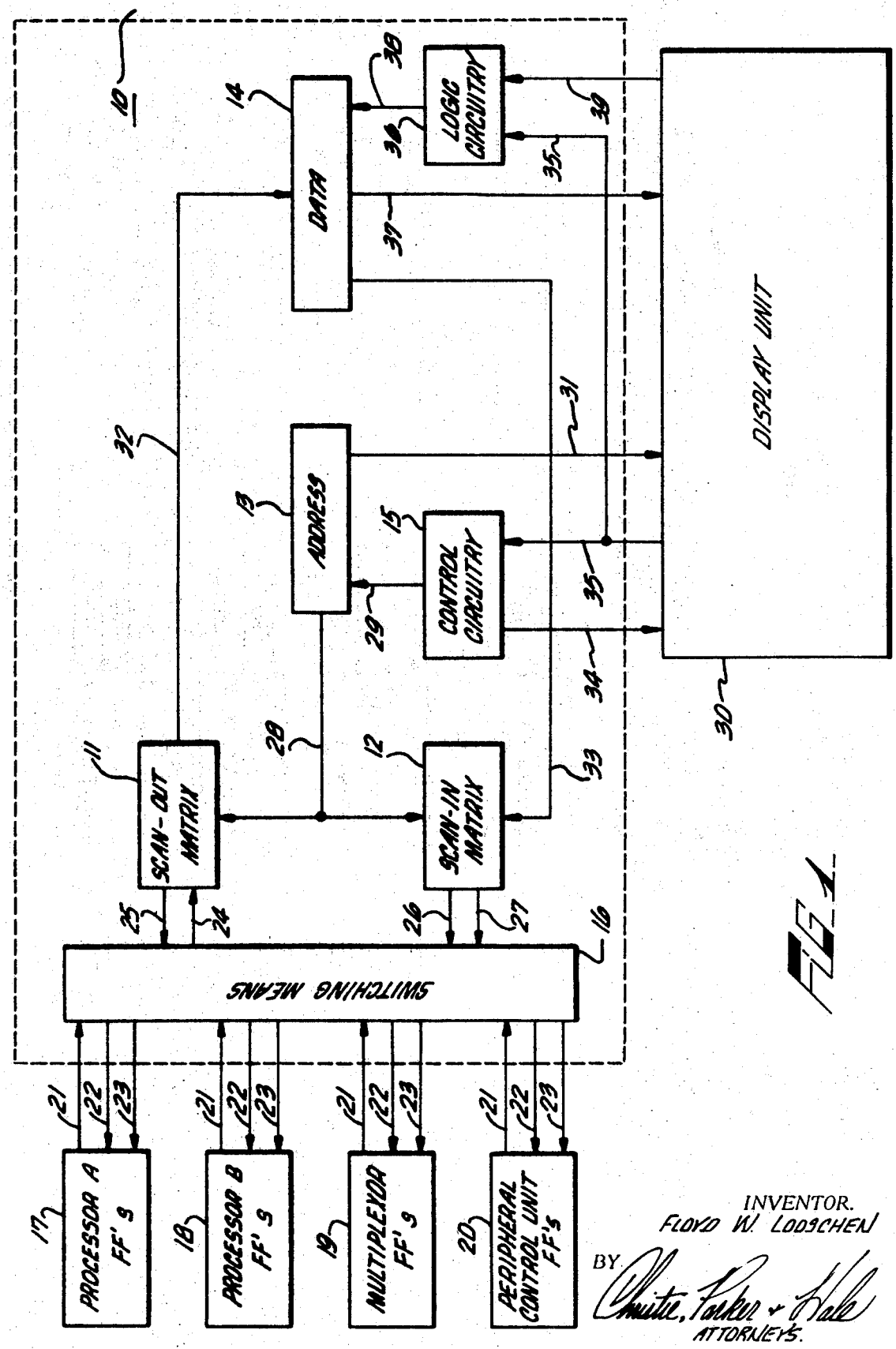
FIG. 1 depicts a general block diagram of a data processing system adapted to utilize the present invention.

FIG. 1 depicts a general block diagram of a data processing system adapted to utilize the present invention.

Processing circuitry 10 generally corresponds to the processing circuitry described in the copending application of Kwan and De Beule referred to hereinbefore. This processing circuitry includes scan-out matrix 11, scan-in matrix 12, address register 13, data register 14, control circuitry 15 and switching means 16. Switching means 16 is utilized to couple the scan-in and scan-out matrices 11 and 12, in a conventional manner, to any selected one of a plurality of separate units, such as processor 17, processor 18, multiplexor 19 or peripheral control unit 20, within the overall data processing system. Each of the units 17 through 20 is coupled to switching means 16 by lines 21 utilized to transmit data from flip-flop circuits within the unit to switching means 16, by lines 22 utilized to transmit data from switching means 16 to the unit, and by lines 23 utilized to transmit address information from the switching means 16 to the unit.

Scan-out matrix 11 is coupled to switching means 16 by lines 24 utilized to transmit data to matrix 11, and by lines 25 utilized to transmit address information to switching means 16. Scan-in matrix 12 is coupled to switching means 16 by lines 26 utilized to transmit data to switching means 16, and by lines 17 utilized to transmit address information to switching means 16.

Address register 13 is coupled to matrices 11 and 12 by lines 28, to control circuitry 15 by lines 29, and to display unit 30 by lines 31. Data register 14 is coupled to scan-out matrix 11 by lines 32, and to scan-in matrix 12 by lines 33. Control circuitry 15 is coupled to display unit 30 by lines 34 and 35, line 35 also coupling display unit 30 to logic circuitry 36. Data register 14 is coupled to display unit 30 by lines 37 and to logic circuitry 36 by lines 38, while logic circuitry 36 is, in turn, coupled to display unit 30 by lines 39.

In operation the scan-out of information signals indicative of the status of flip-flop circuits within a selected one of the units 17 through 20 is accomplished by automatically incrementing the address information stored in register 13. As the contents of register 13 are incremented, matrix 11 presents signals to data register 14 via lines 32 which are indicative of the status of flip-flop circuits in the selected unit. The flip-flop circuits in each of the units 17 through 20 are arranged in words comprising a predetermined number of flip-flops and each such word corresponds to a particular address value stored in register 13. As the contents of register 13 are incremented, these words are sequentially scanned out and presented to data register 14. The scanned words are presented to display unit 30 via scan-out lines 37 while, simultaneously, the address corresponding to any given word being scanned out is presented to display unit 30 via signals on address lines 31. As described hereinafter, display unit 30 utilizes the signals presented on lines 31 and 37 to display the status of the flip-flops in the selected units 17 through 20.

As further described in detail hereinafter, display unit 30 may be used to initiate scan-in operations as a result of signals presented on lines 35 and 39 to control circuitry 15 and logic circuitry 36. By means of such scan-in operations, display unit 30 may be utilized to alter the status of particular ones of the flip-flop circuits within the selected unit.

Figure 2:
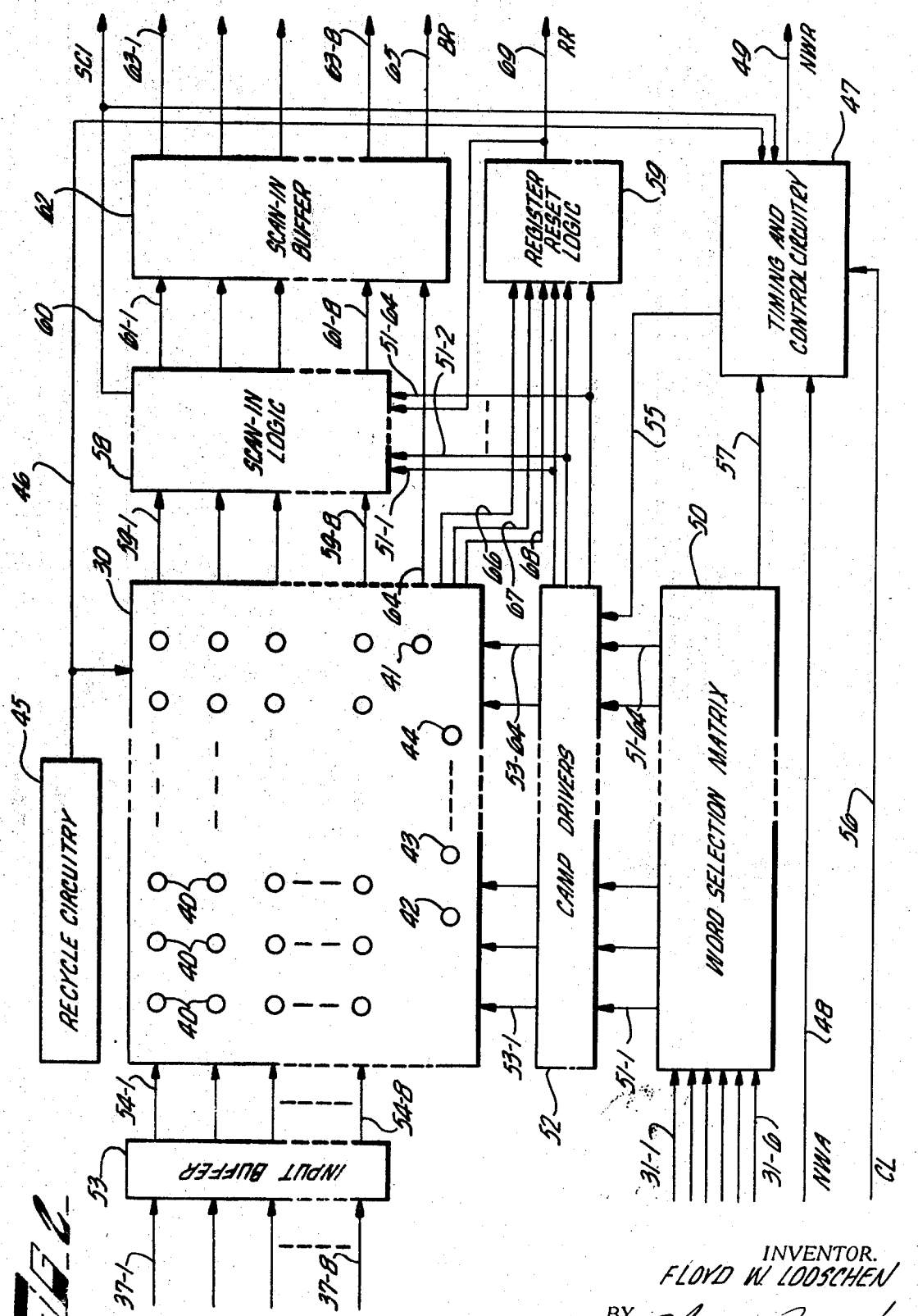
FIG. 2 depicts, in block diagram form, the display unit of the present invention and associated circuitry.

FIG. 2 depicts, in block diagram form, the display unit 30 and circuitry associated therewith. Display unit 30 includes a plurality of push buttons 40. The push buttons 40 are arranged in rows and columns with each column of push buttons being associated with one of the words of flip-flops in the selected one of the units 17 through 20. For purposes of illustration, it will be assumed that there are sixty-four such columns and that each column includes eight such push buttons 40, each being associated with a particular one of eight flip-flops in the associated word. Each of the push buttons 40 has an incandescent lamp associated therewith which indicates, during the operation of the present invention, the status of that particular flip-flop circuit associated with this lamp. Additionally, display unit 30 includes a bit reset button 41 and register reset buttons 42, 43 and 44.

Initially, recycle circuitry 45 presents a signal on line 46 which turns off all of the lamps on display unit 30, thus clearing the unit. The signal on line 46 is also presented to timing and control circuit 47 thereby initiating counting circuitry within circuitry 47, as described further hereinafter. A signal on line 48 from processing circuitry 10 indicates that the next word is available to be scanned out of the selected discrete unit. In response to the signal on line 48, timing and control circuitry 47 presents a signal on line 49 which indicates that the next word to be scanned out is requested. The signal on line 49 causes the next flip-flop word to be scanned out. Consequently, signals indicative of the status of the scanned word are presented on scan-out lines 37–1 through 37–8. Simultaneously, signals indicative of the address of the first word being scanned out at presented on address lines 31–1 through 31–6. Word selection matrix 50 decodes the address information presented on lines 31 and in response thereto presents a signal on one of the lines 51–1 through 51–64. In response to the first word being scanned out, selection matrix 50 will present a signal on line 51–1. Lamp drive circuitry 52 presents a signal on one of the lines 53–1 through 53–64 in response to the signal on lines 51. The signals on lines 37–1 through 37–8 set input buffer 53 to a state corresponding to the status of the flip-flop word being scanned out and it, in turn, presents signals on lines 54–1 through 54–8 which also correspond to the status of the word being scanned out. As described hereinafter, combination of signals on lines 53 and 54 is effective to set the lamps, in that particular column on display unit 30 which corresponds to the word being scanned, to states indicative of the status of the scanned word.

The lamp driving circuitry 52 presents a drive signal on a selected one of the lines 53–1 through 53–64 at the time a signal is presented on line 55 from timing and control circuitry 47. A clock signal on line 56 from the clock for the over-all data processing system is also presented to timing and control circuitry 47. As each word of the flip-flops in the selected unit is scanned, a signal first appears on line 48 indicating that the next word is available for scanning; circuitry 47 thereafter presents a signal on line 49 indicating that the next word is requested. In response to the signal on line 49 the next word is scanned out of the selected unit; thereafter a signal on line 55 causes the lamps in the row of display unit 30 corresponding to the word being scanned to be set into states indicative of the status of flip-flops in the scanned word. The scanning operation continues in a similar manner until the last word of flip-flops is scanned. In the circuit of FIG. 2, this is the sixty-fourth word scanned from the selected unit.

Selection matrix 50 recognizes that the last word is being scanned and, in response thereto, presents a signal on line 57 which is connected to timing and control circuitry 47. In response to the signal on line 57 timing and control circuitry 47 does not present signals on line 49 or on line 55 until a subsequent signal is again presented on line 46 from recycle circuitry 45. At the end of each complete scan operation, lamps on display unit 30 will visually depict the status of flip-flop circuits in the sixty-four words scanned from the selected unit. Recycle circuitry 45 periodically presents recycle signals on line 46 and the complete scan operation is normally completed after each recycle operation. Push buttons on display unit 30 enable the status of any flip-flop to be altered. The flip-flop to be altered is selected by depression of the one of the push buttons 40 corresponding to the selected flip-flop. If "bit reset" position button 41 is depressed the selected flip-flop will be reset while if this push button is not depressed, it will be set.

Lines 51–1 through 51–64 presented to drive circuitry 52 are also presented to scan-in logic circuitry 58 and to register reset logic circuitry 59. Depression of one of the push buttons 40 causes a signal to be presented on one of the lines 59–1 through 59–8 corresponding to the bit location within its word of the depressed push button 40. When the word corresponding to the depressed push button 40 is scanned, logic circuitry 58 presents a signal on line 60 indicating that a scan-in operation is to be performed. It also presents signals on one of the lines 61–1 through 61–8 to scan-in buffer circuitry 62 which, in turn, presents a signal on one of the lines 63–1 through 63–8. The particular one of the lines 63–1 through 63–8 having a signal thereon indicates the bit location within the scanned word of the flip-flop whose status is to be altered.

Depression of "bit reset" button 41 presents a signal on line 64 connected to buffer 62 which, in turn, presents a signal on line 65. The signal on line 65 indicates that the flip-flop to be altered is to be reset rather than to be set. The scan-in operation is performed utilizing the signals on lines 63 and line 65 in a manner described hereinafter and subsequent to the scan-in operation, the scan-out operations are resumed.

Push buttons 42, 43 and 44 enable entire words of flip-flops to be reset during scan-in operations. Depression of one of these buttons presents a signal on a respective one of the lines 66, 67 and 68 connected to register reset logic circuit 59. A signal on one of the lines 66, 67 and 68 causes register reset logic circuitry 59 to present a signal on line 69 whenever any word associated with the particular depressed button is scanned. Line 69 is also connected to scan-in logic circuitry 58 and causes it to present a signal on line 60 whenever a word to be reset in response to depression of one of the buttons 42, 43, or 44 is scanned. Thus, signals on lines 60 and 69 indicate that the word scanned is to be altered by resetting the entire word. The manner in which this register reset operation is effected is also described hereinafter.

Figure 3:
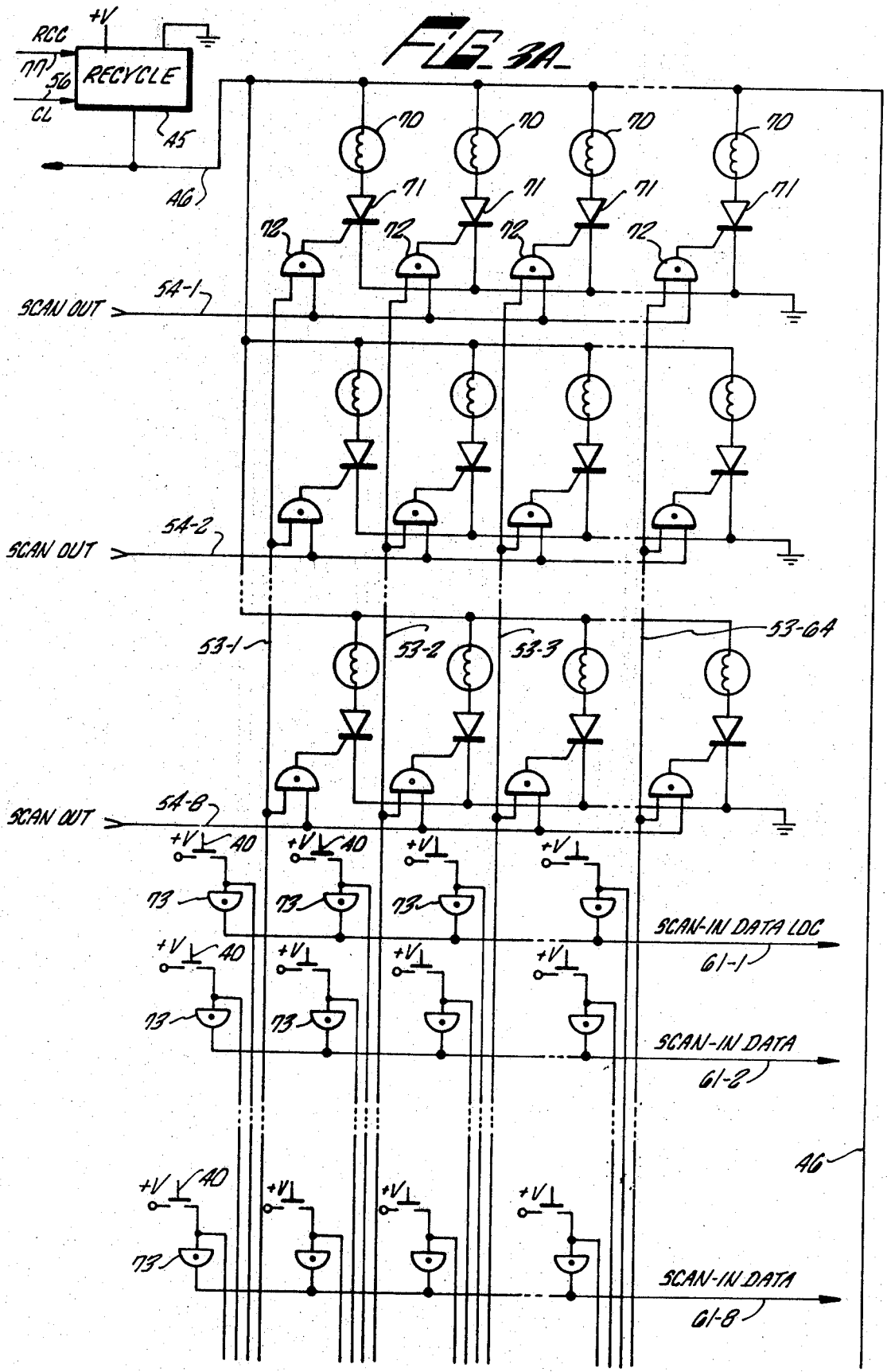
FIG. 3, comprising

FIG. 3 depicts a portion of display unit 30 and indicates the manner in which lamps on display unit 30 are utilized to denote the status of associated flip-flop circuits. FIG. 3 depicts circuitry associated with the first, second and eighth bit locations of the first, second, third and sixty-fourth words displayed on unit 30. Each bit location includes a lamp 70, a silicon controlled rectifier 71 serially connected thereto, and an AND gate 72 connected to the trigger or gate terminal of the rectifier 71. One input terminal of each AND gate 72 is connected to one of the scan-out data lines 54–1 through 54–8, while the other input terminal of each AND gate 72 is connected to one of the drive lines 53–1 through 53–64 from drive circuitry 52. Additionally, each bit location has associated therewith one of the push buttons 40 and a gate 73. Each push button, upon being depressed, presents a signal to the input of its associated gate 73. The outputs of gate 73 are connected to respective ones of the scan-in data location lines 61–1 through 61–8. Closing of the push buttons 40 also causes signals to be presented on the input terminals of OR gates 74–1 through 74–64. The push buttons 40 associated with each word are connected to the input terminals of respective ones of the OR gates 74–1 through 74–64. The output terminals of gates 74–1 through 74–64 are respectively presented to one input of AND gates 75–1 through 75–64. Lines 51–1 through 51–64 are respectively connected to the other input terminal of each of the AND gates 75–1 through 75–64. Lines 51–1 through 51–64 present output signals from AND gates 76–1 through 76–64, respectively. Address signals on lines 31–1 through 31–6 are presented to the input terminals of AND gates 76–1 through 76–64 in a conventional manner whereby the gates 76 are utilized as a selection matrix to decode signals presented on address lines 31 and to present a signal on that one of the lines 51–1 through 51–64 which corresponds to the particular word of flip-flop circuits in the selected unit which is identified by the combination of signals on lines 31.

During the operation of the present invention a recycle signal on line 46 from recycle circuitry 45 initially clears the display unit by turning off all of the lamps 70 which previously had been on. It does this by presenting ground potential on line 46. Each of the lamps 70 subsequently remains in its off condition until the silicon controlled rectifier 71 associated with any particular lamp 70 is triggered. The signal on line 46 also initiates operation of timing and control circuitry 47. Thus, subsequent to a recycle signal, timing and control circuitry 47 presents a signal on line 49 if line 48 indicates that the first word of flip-flop circuits is available to be scanned. The signal on line 49 causes associated processing circuitry to address and scan-out the first word of flip-flop circuits. The status of these flip-flop circuits is manifested by signals on scan-out data lines 54–1 through 54–8 while the address of the first word scanned is presented on lines 31–1 through 31–6. AND gates 76 decode the signals presented on lines 31 and, in response to signals indicative of the first word, gate 76–1 will present a signal on line 51–1. Subsequently, timing and control circuitry 47 under the control of clock signals on line 56 presents a signal on line 55 which enables lamp drive circuitry 52 to trigger those rectifiers 71 in the first word which are associated with those flip-flop circuits in the selected unit which are in the set condition. An additional control signal on line 77 may be utilized in conjunction with AND gate 78 to enable drive circuitry 52 to set the selected rectifiers only when a signal is present on line 77.

The selected lamps 70 in the first word being scanned are turned "on" by means of the simultaneous presence of signals on line 53–1 and on particular ones of the scan-out data lines 54–1 through 54–8. Thus, for example, if a signal is presented on line 53–1 and on line 54–1, gate 72 will trigger the silicon controlled rectifier 71 associated with the lamp 70 in the first bit location of the first word and will cause this lamp to be turned "on." Recycle circuitry 45 at this time presents a positive voltage level on line 46 which causes a current to flow through the selected lamp 70. As subsequent words of the unit are scanned the lamps 70 of the first word which were turned "on," remain "on" as a result of the trigger characteristics of silicon controlled rectifiers. After the first word has been scanned, subsequent words are scanned in a similar manner and lamps associated with those words are selectively turned "on" to indicate the status of flip-flop circuits in those words. As the last word is scanned a signal is presented on line 57 which prevents the timing and control circuitry 47 from presenting subsequent signals on lines 49 or 55 prior to reception of the next recycle signal on line 46. Subsequent to the scan of the last word the display unit will manifest the status of each associated flip-flop in the selected unit until the next recycle signal initiates a subsequent scan-out operation.

Scan-in operations may be initiated by the push buttons 40. If, for example, it is desired to alter the status of the flip-flop circuit in bit location one of the second word, the pushbutton 40 associated with this particular flip-flop circuit is depressed. Consequently, a signal is presented to OR gate 74–2 the output of which presents a signal upon one input terminal of AND gate 75–2. No signal appears at the output of AND gate 75–2, however, until the subsequent scan-out of the second word. When the second word is again scanned, gate 75–2 presents a signal on scan-in control line 60. Depression of this particular push button 40 also presents a signal on line 61–1 indicating that it is the flip-flop circuit in the first bit location which is to be altered. The signals on lines 61–1 and on line 60 cause a scan-in operation to be initiated as discussed hereinafter and normally cause this scan-in operation to establish a set condition in the designated flip-flop circuit. If, however, push button 41 is also depressed, a resulting signal on line 64 indicates during the scan-in operation that the identified flip-flop circuit should be reset rather than set. The signal on line 60 also serves to inhibit timing and control circuitry 47 from presenting signals on either line 49 or line 55 until the scan-in operation is completed. Upon completion of the scan-in operation the timing and control circuitry 47 again presents a signal on line 49 and the sequence of scan-out operations is resumed.

The depression of register reset buttons 42 or 43 enables one or more entire words of flip-flop circuits to be reset during scan-in operations. Thus, for example, depression of push button 42 enables reset of the second and third words, while depression of push button 43 enables reset of the first word. Depression of push button 43 presents a signal on one input terminal of AND gate 80; the output terminal of AND gate 76–1 presents a signal on the other input terminal of gate 80 whenever the first word is identified by the signals on lines 31–1 through 31–6. Thus, when this first word is scanned depression of push button 43 presents a signal on register reset line 69. The signal on line 69 also presents, via gate 81, a signal on scan-in control line 60. The signal on line 60 again indicates that a scan-in operation is to be performed while the signal on line 69 indicates that all flip-flops of the word being scanned are to be reset. Depression of push button 42 accomplishes the same reset of flip-flops whenever either the second or third word is scanned. Thus, the scan of the second word causes AND gate 82 to present a signal on register reset line 69 while the scan of the third word causes AND gate 83 to present a signal on register reset line 69.

The normal clearing, or turning "off," of all of the lamps 70 in response to periodic recycle signals from circuitry 45 may be inhibited, thus freezing the information displayed for an indefinite period, by means of levels on line 77. The presence of a positive voltage level on line 77 may be utilized to indicate that normal operation of recycle control circuitry 45 is desired. The presence of ground potential on the line may be utilized to inhibit circuitry 45 from presenting recycle signals on line 46 thereby preventing the clearing of lamps 70. Ground potential on line 77 may also be utilized to inhibit timing and control circuitry 47 from enabling the setting of additional lamps since AND gate 78 must be enabled in order to allow drive circuitry 52 to present drive signals on the lines 53–1 through 53–64.

Figure 4:
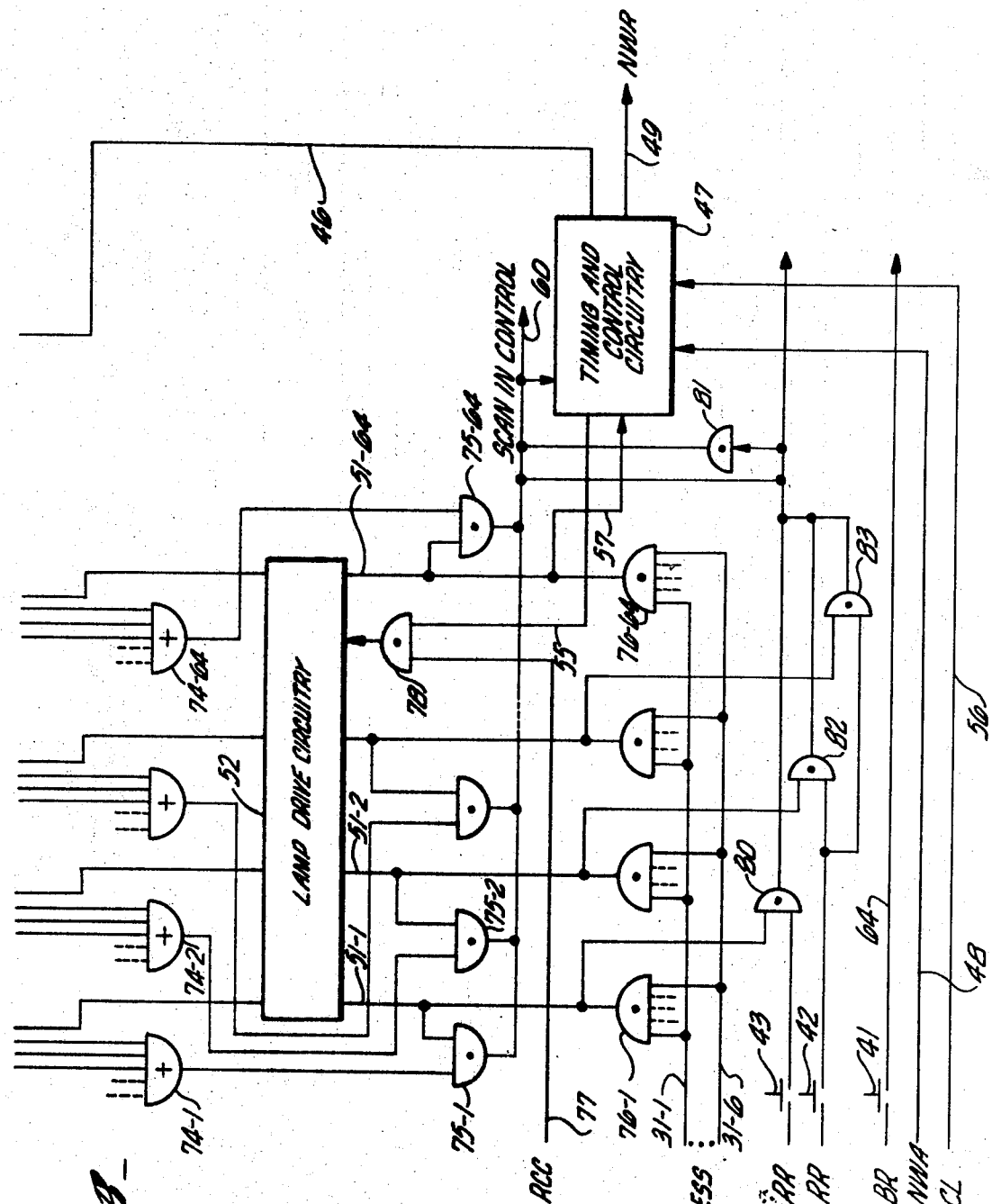
FIG. 4 depicts, in block diagram form, the processing circuitry of FIG. 1.

FIG. 4 depicts, in block diagram form, the manner in which associated processing circuitry may be utilized to effect the desired scan-in and scan-out operations. In response to a recycle signal on line 46 address register 13 is cleared. Control circuitry 15 presents a "next word available" signal on line 48 if the scanning circuitry is available for use by the display unit 30. Control circuitry 15 may be utilized to initiate and enable operation of the present invention by presenting a signal on line 48. In response to the signal on line 48, a second signal is presented on line 49 requesting that the next word be scanned out. In response to the latter signal, control circuitry 15 activates counting circuitry 83 to count up address register 13 by one. As a result, the address lines 31–1 through 31–6 will manifest the address of the first word of flip-flop circuits in the selected unit. Signals indicative of this address are presented to scan-out matrix 11 by lines 28 and, responsive to a control signal on line 84 from control circuitry 15, the designated data is scanned out of the selected unit in a conventional manner and presented to data register 14 via lines 32. Data register 14 presents the scanned out data on output lines 37–1 through 37–8. The scan-out operation proceeds as discussed previously with a new signal on line 49, indicating that scan-out of the next word is requested, being presented subsequent to each scan-out operation. Each signal presented on line 49 causes the address in register 13 to be incremented by one and effects the scan-out of a subsequent word in the selected unit.

Figure 7:
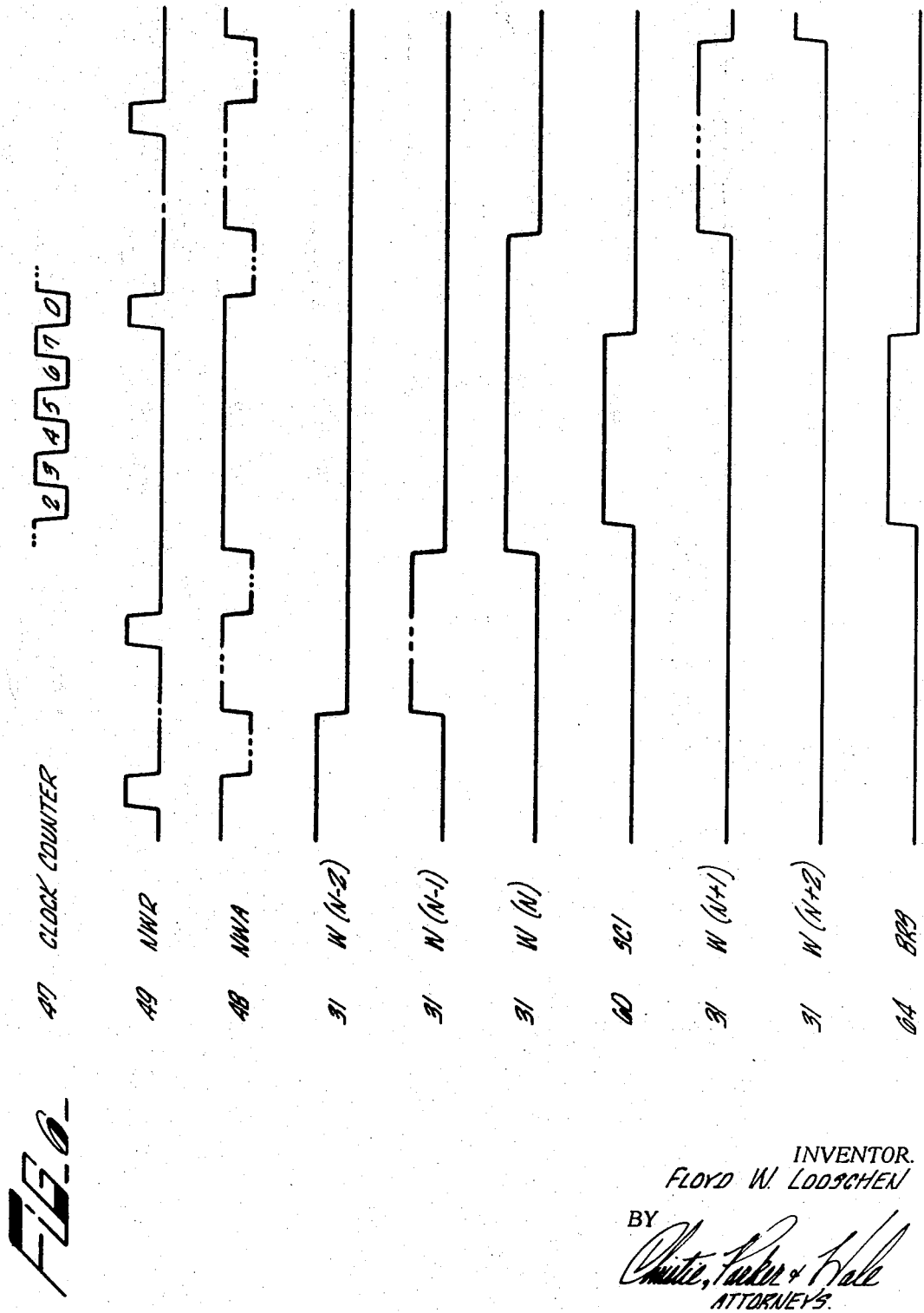

Scan-in operations, whether single bit scan-ins or register reset scan-ins, are effected by means of control circuitry 15, logic circuitry 36, and the signals presented thereto. Thus, with respect to a single bit scan-in, a scan-in control signal is presented on line 60 to both control circuitry 15 and to logic circuitry 36. In addition, signals on scan-in data locations lines 61–1 and 61–8 indicate the bit location, within the word being scanned, of the flip-flop circuit whose status is to be altered. Additionally, if however, during the time signals on line 31 manifest each of the words which are to be reset during scan-in operations. Additionally, FIG. 7 depicts the signal on line 69 indicative that an entire word is to be reset during a scan-in operation. This signal is presented on line 69 simultaneously with the presentation on lines 31 of signals manifesting word $WX_n$ and remains on line 69 until the lines 31 present signals manifesting words $W'X_{n+1}$, this being the word after the last word to be reset.

Figure 8:
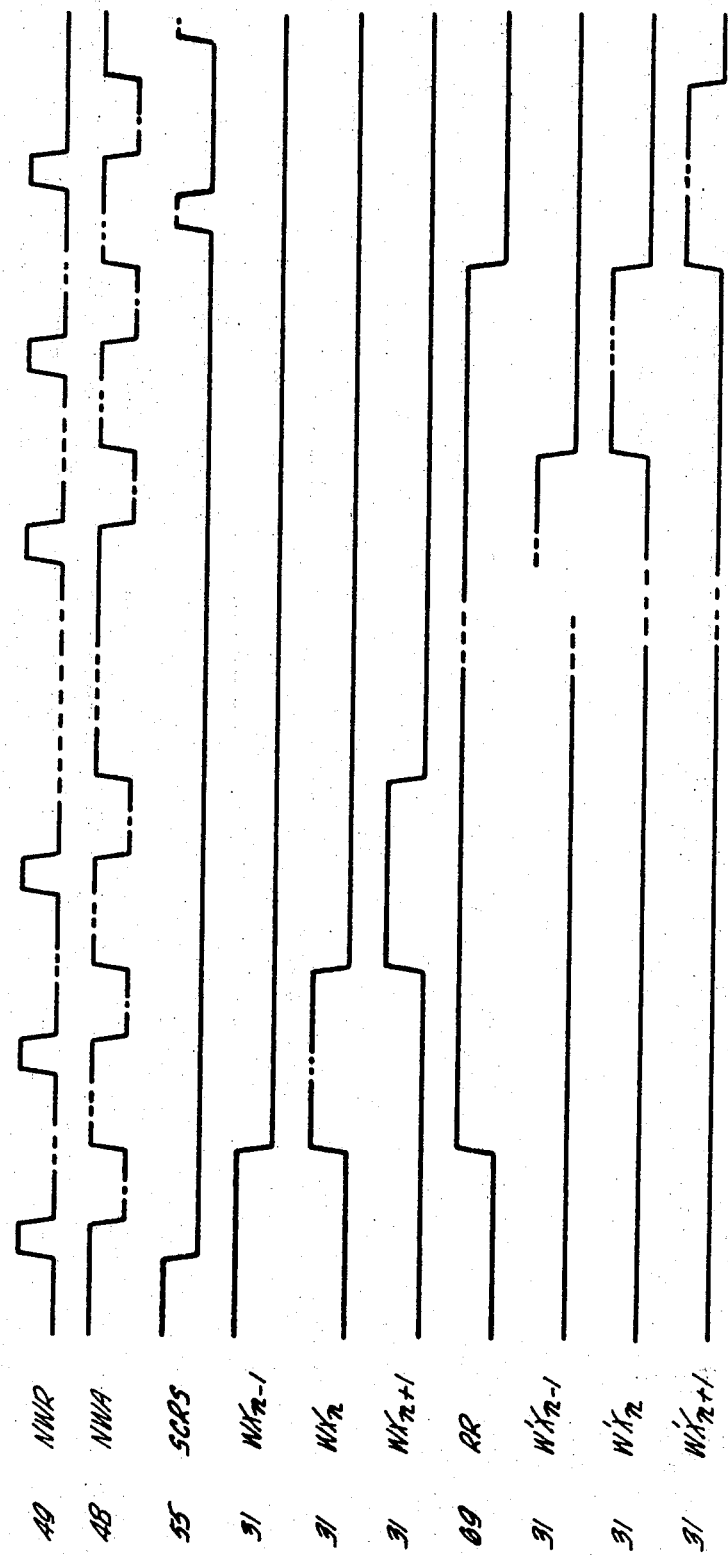
Figure 9:
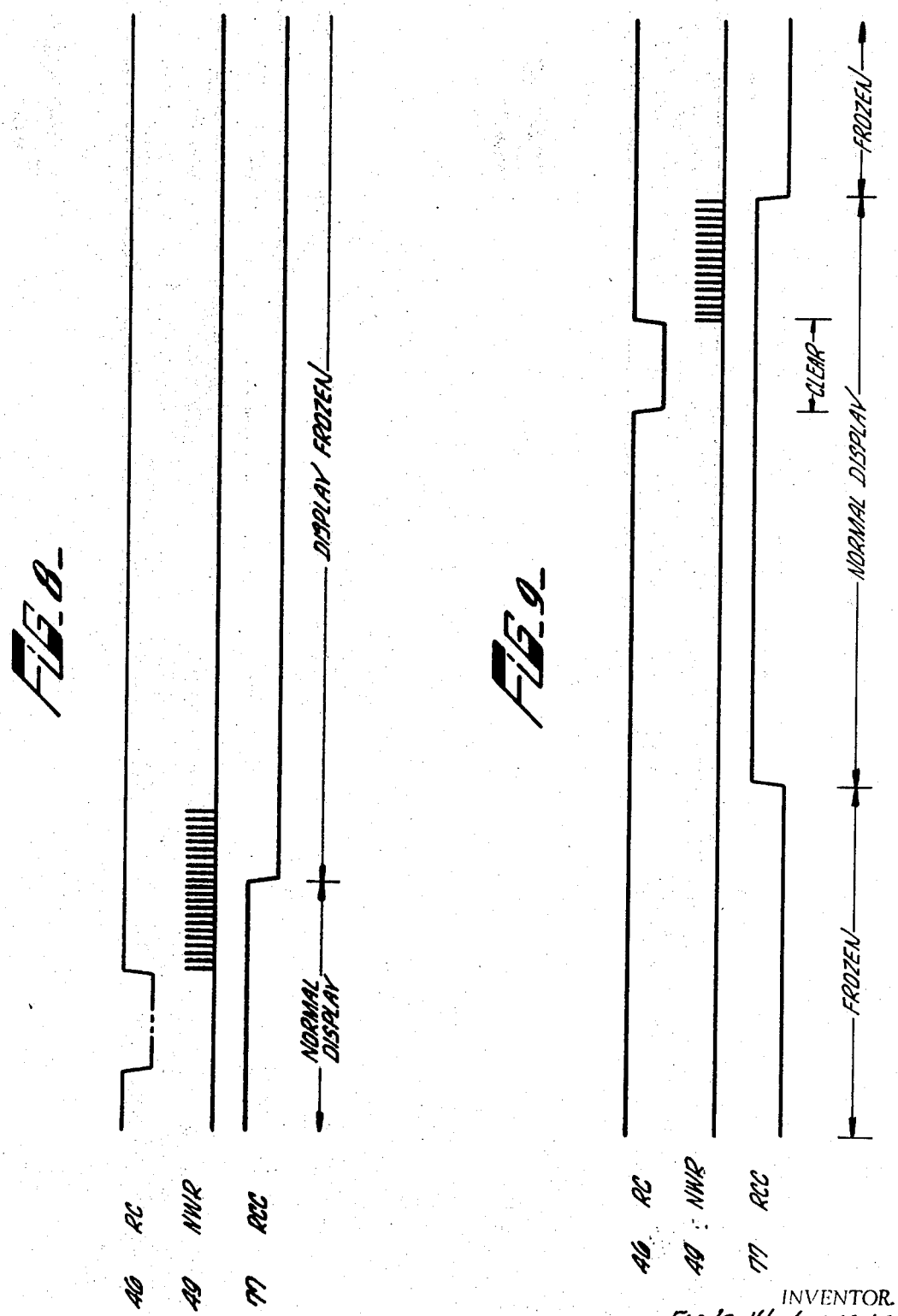

FIGS. 8 and 9 present timing signals indicating the relationships between several of the signals utilized by the present invention when a control signal on line 77 is utilized to freeze the conditions of lamps in display unit 30.

FIG. 8 depicts signal relationships when the positive voltage level presented on line 77 is replaced by ground potential during a scan-out operation. The display unit will consequently be frozen in the condition in which it depicts the status of flip-flops as of the time ground potential is applied to line 77 since no subsequent silicon controlled rectifiers can be triggered and since recycle signals are inhibited. Thus, it is seen that the removal of the positive voltage level on line 77 will freeze the display as of the time the voltage level is removed.

FIG. 9 depicts signal relationships when the positive voltage level on line 77 is removed after a complete scan operation in order to freeze the display unit and prevent the unit from being cleared by a subsequent recycle signal. By timing the duration of the positive voltage level on line 77 such that it is present during an entire scan-out cycle but during only one such cycle, it may be utilized to freeze the contents of the display unit such that the unit will depict the information read out during that single scan-out cycle and will depict it until a positive voltage level is again presented on line 77. This may be accomplished, for example, by causing the positive voltage level on line 77 to terminate shortly after the appearance of a signal on line 57 indicating that the last word has been scanned during the single scan-out cycle with respect to which the unit is to be frozen.

Figure 10:
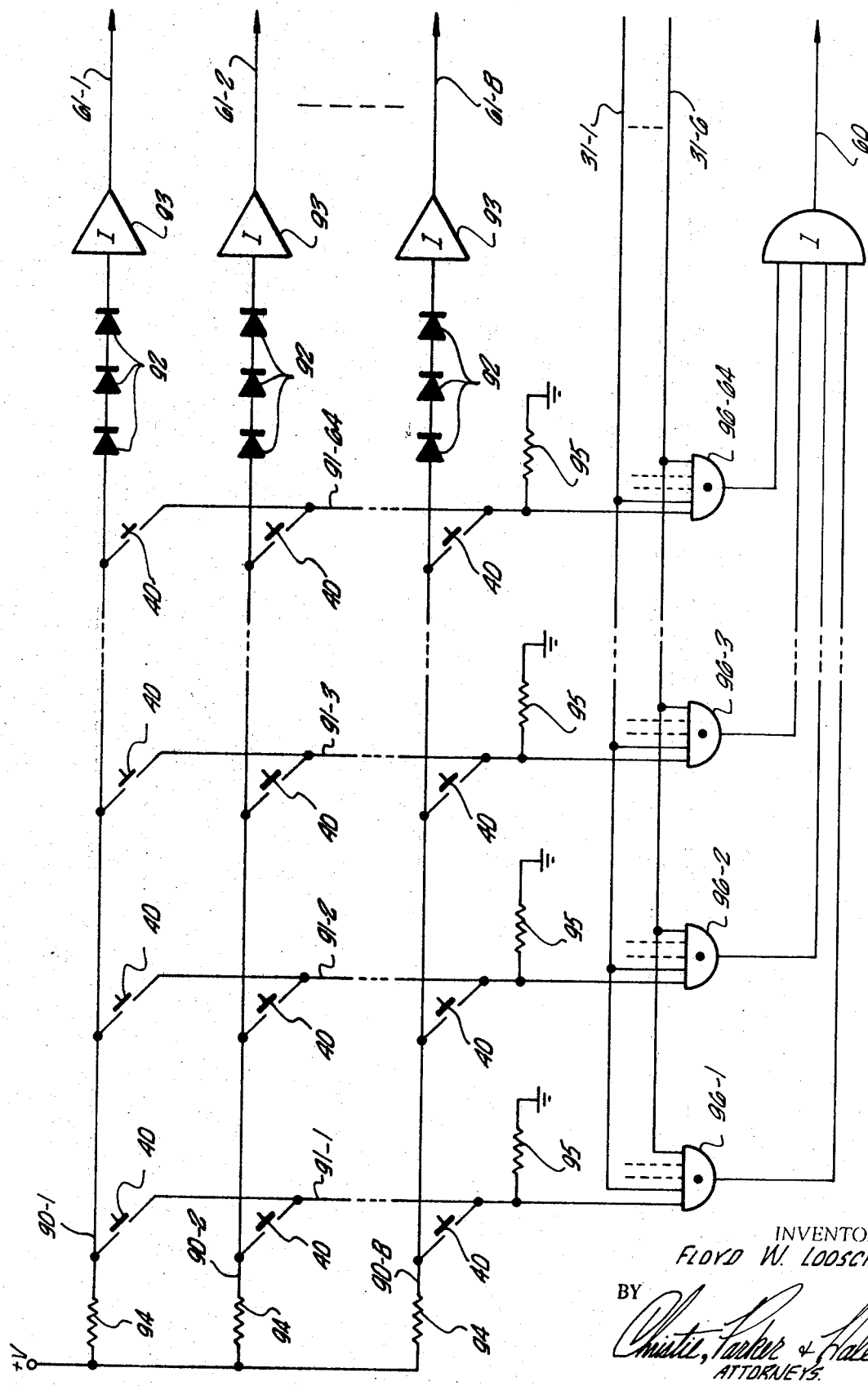
FIGS. 10 and 11 depict alternative circuit arrangements which may be utilized in the display unit.

FIG. 10 depicts an alternative arrangement which may be utilized to present signals on scan-in control line 60 and on scan-in data location lines 61-1 through 61-8. In FIG. 10, the push buttons 40 themselves are positioned at the cross points of a first group of lines 90-1 through 90-8 and a second group of lines 91-1 through 91-64. Each of the lines 90-1 through 90-8 is connected to a respective one of the data location lines 61-1 through 61-8 by a group of three diodes 92 and an inverter circuit 93. Each of the lines 90-1 through 90-8 is connected at its opposite end, via resistor 94, to a source of positive voltage. A resistor 95 is connected between ground potential and each of the lines 91-1 through 91-64. Lines 91-1 through 91-6 and 31-1 through 31-6 are connected to the input terminals of AND gates 96-1 through 96-6 in a conventional manner such that signals on the lines 31-1 through 31-6 will enable particular ones of the gates 96, as determined by the address information stored on these lines, but will enable such gate only if a push button 40 associated with its respective line 91 is depressed. Output terminals from the gates 96 are presented to OR gate 97, the output of which is presented to scan-in control line 60. During the scan-in operation a relatively high voltage signal is presented on line 60 and on a particular one of the lines 61. At other times all of these lines present a relatively low value of potential.

Push buttons 40 and signals on lines 31-1 through 31-6 control the values of potential presented on lines 60 and 61. Thus, if none of the push buttons 40 is depressed a relatively small drop in voltage takes place across the resistors 94, a relatively high voltage is presented to inverters 93, and a low value of voltage is consequently presented on the lines 61-1 through 61-8. Similarly, each of the lines 91-1 through 91-64 remains essentially at ground potential when none of the push buttons 40 is depressed thereby preventing activation of any of the gates 96. When, however, a particular one of the push buttons 40 is depressed a connection is accomplished between a particular one of the lines 90 and a particular one of the lines 91. Thus, for example, if the push button 40 in the first bit location of the first word is depressed a connection is made between line 90-1 and line 91-1. Consequently, a current flows from the source of positive voltage through resistor 94 of line 90-1 and thence through resistor 95 connected to line 91-1 to ground. Because of the increased voltage drop across resistor 94 and the additional drop across diodes 92 of line 90-1, a relatively small voltage signal is presented to the input of inverter 93. Consequently, a relatively high voltage signal is presented on line 61-1. Similarly, the voltage drop effected across the resistor 95 connected to line 91-1 causes a relatively high voltage signal to appear on line 91-1 and upon one input terminal of gate 96-1. When lines 31-1 through 31-6 next present signals manifesting the first address word, gate 96-1 is activated and a signal is presented on scan-in control line 60. The remaining push buttons 40 may similarly be utilized to present signals on a particular one of the data location lines 61 and to effect activation of a particular one of the gates 96. The advantage of the alternative circuitry shown in FIG. 10 is that it reduces the number of electrical connections and gates required in the depicted portion of the display unit. In a preferred arrangement of the circuitry depicted in FIG. 10 the voltage designated $+V$ is a positive voltage of 4.5 volts, resistor 94 are of 240 ohms, resistors 95 are of 180 ohms, and diodes 92 are selected to have a total voltage drop of approximately 1.8 volts.

Figure 11:
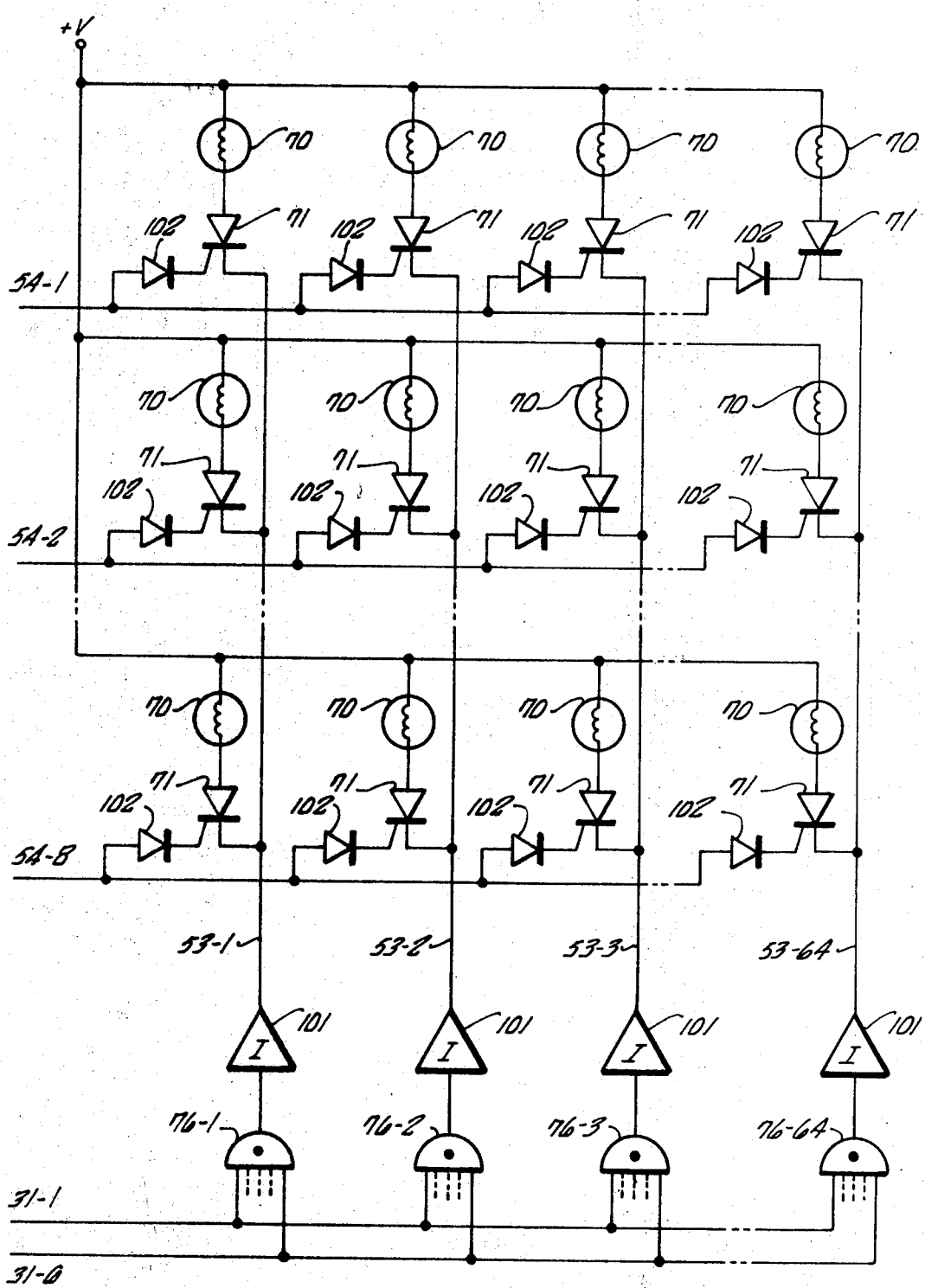

FIG. 11 depicts an alternative circuit arrangement which may be utilized in the display unit of the present invention to effect selection of the lamps 70 and their corresponding rectifiers 71. In the circuit of FIG. 11 each of the word select lines 53-1 through 53-64 is connected between an inverter circuit 101 and the cathode of each of the silicon controlled rectifiers 71 associated with respective ones of the words. The gate terminal of each rectifier 71 associated with a particular bit location is connected via a diode 102 to a respective one of the scan-out lines 54-1 through 54-8. Each of the lamps 70 is connected between the anode of its associated rectifier 71 and a source of positive voltage. The word select gates 76-1 through 76-64 are connected to the input terminals of respective ones of the inverter circuits 101. Inverter circuits 101 associated with nonselected ones of the AND gates 76 present a positive voltage on their respective word lines 53. The positive voltage presented by the inverter circuits 101, however, is less than the positive voltage presented to the lamps 70. Consequently, a lamp which has previously been turned "on" as a result of its associated rectifier 71 having been triggered will remain "on" although its associated word line 53 subsequently has a positive voltage presented thereon by one of the inverter circuits 101. Selection of one of the AND gates 76 causes its associated inverter circuit 101 to present a voltage of approximately ground potential to its associated word line 53. A particular rectifier 71 is triggered only when a positive signal is presented on its gate terminal via its associated one of the scan-out lines 54-1 through 54-8 and its associated diode 102, and when ground potential is applied to its associated one of the word select lines 53-1. The manner of operation of the circuit depicted in FIG. 11 is thus similar to that described in conjunction with that of the circuitry shown in FIG. 3. The alternative circuit arrangement shown in FIG. 1 permits elimination of each of the gates 72 shown in FIG. 3.

Various circuits of types well known in the prior art have been depicted in block diagram form. Actual circuits capable of performing the functions described herein for those shown in block diagram form may easily be provided by one having knowledge of the prior art.

What have been just described herein are considered to be only illustrative embodiments of the present invention.

the flip-flop to be altered is to be reset rather than set, a signal is presented to logic circuitry 36 on line 64. In response to the signals on lines 60, 61 and 64, logic circuitry 36 presents signals on lines 38–1 through 38–8 to data register 14 which signals are indicative of the data word to be scanned into the flip-flop circuits of the selected unit. Subsequently, control circuitry 15 effects the scan-in operation by which the data word is transmitted via line 33 to scan-in matrix 12 and thence to the selected unit under the control of a signal presented on line 85 by control circuitry 15. Subsequent to the scan-in operation a signal again appears on line 49 and the normal scan-out operations resume.

Scan-in operations of the register reset type are effected by control circuitry 15 and logic circuitry 36 in response to the scan-in control signal presented on line 60 and a register reset signal presented on line 69. These signals are presented on their respective lines whenever the address register 13 is presently storing the address of a word, the flip-flops of which are all to be reset (cleared). In response to the signals on lines 60 and 69, logic circuitry 36 presents signals on lines 38–1 through 38–8 which are of a polarity to clear register 14. A subsequent scan-in operation under the control of a signal on line 85 from control circuitry 15 is effective to clear all of the flip-flop circuits in the identified word within the selected unit. A subsequent "next word request" signal on line 49 is again effective to increment by one the address stored in register 13. If at this time all of the words identified by the particular register reset button being depressed have been reset, the system will resume the normal scan-out sequence of operations. If, however, the subsequent word is also to be reset, signals will again be presented on lines 60 and 69 and the flip-flops comprising this word in the selected unit will also be reset. Subsequently, another "next word request" signal on line 49 will again increment by one the address stored in register 13. The scan-in operations just described will be continued until all words identified by the particular register reset button being activated have been reset, at which time the normal scan-out sequence of operations will resume.

FIGS. 5 through 9 depict timing diagrams which indicate the relationships between various signals utilized during the various operation sequences of the present invention. The operation of the present invention may be more clearly understood by reference to these timing diagrams.

Figure 5:
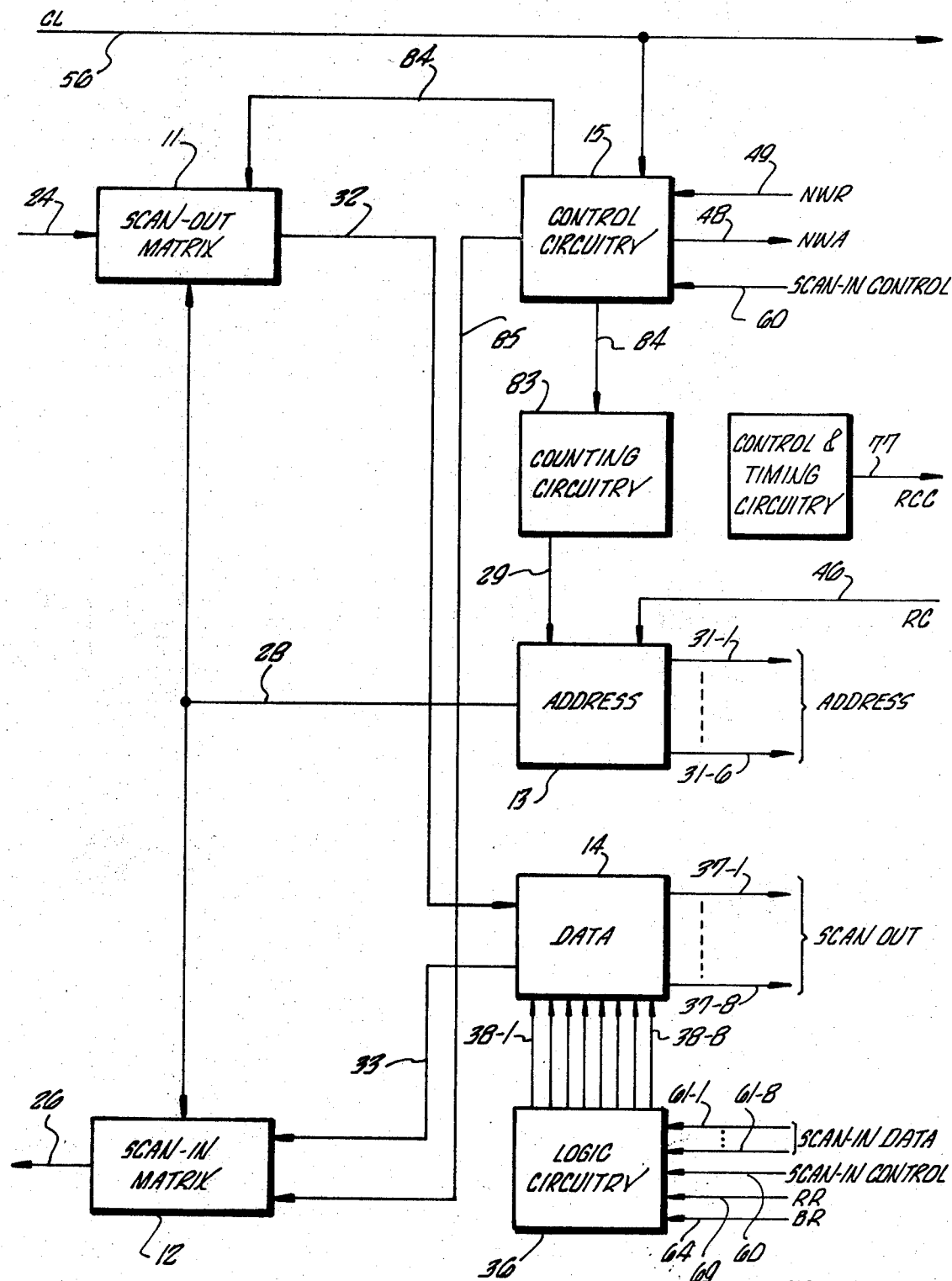
FIGS. 5 through 9 depict timing diagrams which indicate the relationship between various signals utilized during the operation of the present invention.

FIG. 5 depicts the relationship between some of the signals utilized by the present invention during normal scan-out operations. The clock signals presented on line 56 are depicted and may, for example, be presented to the system at a rate of two megacycles per second. Additionally, the recycle signals presented on line 46 are depicted. The recycle signals may, for example, be of about twenty microseconds in duration and repeated every ten thousand microseconds.

FIG. 5 also depicts signals presented by a clock counter which may advantageously be included within timing and control circuit 47. This counter repeatedly counts through an eight count sequence in response to clock signals presented to circuitry 47 on line 56. FIG. 5 also depicts the "next word request" signals presented on line 49 by timing and control circuitry 47 and the "next word available" signal presented to circuitry 47 on line 48. The "next word request" signals are normally presented in synchronism with the zero state of the counter but are only presented if the signal on line 48 shows that the next word is available. As shown in FIG. 5, the "next word available" signal is normally present but terminates for two clock periods immediately after each "next word request" signal. During the time that the "next word available" signal terminates, the clock counter in timing and control circuitry 47 is inhibited. The counter resumes counting, however, as soon as the "next word available" signal again commences. FIG. 5 also depicts the signals presented on line 55 by timing and control circuitry 47. These signals enable the drive circuits 52 to trigger the identified silicon controlled rectifiers of each word on display unit 30 as these words are scanned. As shown in FIG. 5, the signals on line 55 normally coincides with states two through seven of the counter. FIG. 5 also depicts the signal presented on line 57 whenever the last word in each scan cycle is reached. This signal coincides with state one of the counter following the "next word request" signal on line 49 which caused address register 13 to advance to the address of the last word. The presence of a signal on line 57 inhibits timing and control circuitry 47 from presenting subsequent "next word request" signals on line 49 and also inhibits it from presenting subsequent signals on line 55 to trigger particular ones of the set silicon controlled rectifiers. As a result, no scan-out operations occur subsequent to the occurrence of a signal on line 57 until the next recycle signal is presented on line 46. As shown in FIG. 5 the next recycle signal again initiates the sequence of scan-out operations.

In addition, FIG. 5 depicts signals indicative of the presence of signals on address lines 31–1 through 31–6 manifesting the addresses of the last two words of one scan cycle and the first word of a succeeding scan cycle. The signal indicative of the last word which is presented on line 57 may be seen to be identical with the signal indicative of the last or sixty-fourth word of the scan cycle.

Figure 6:
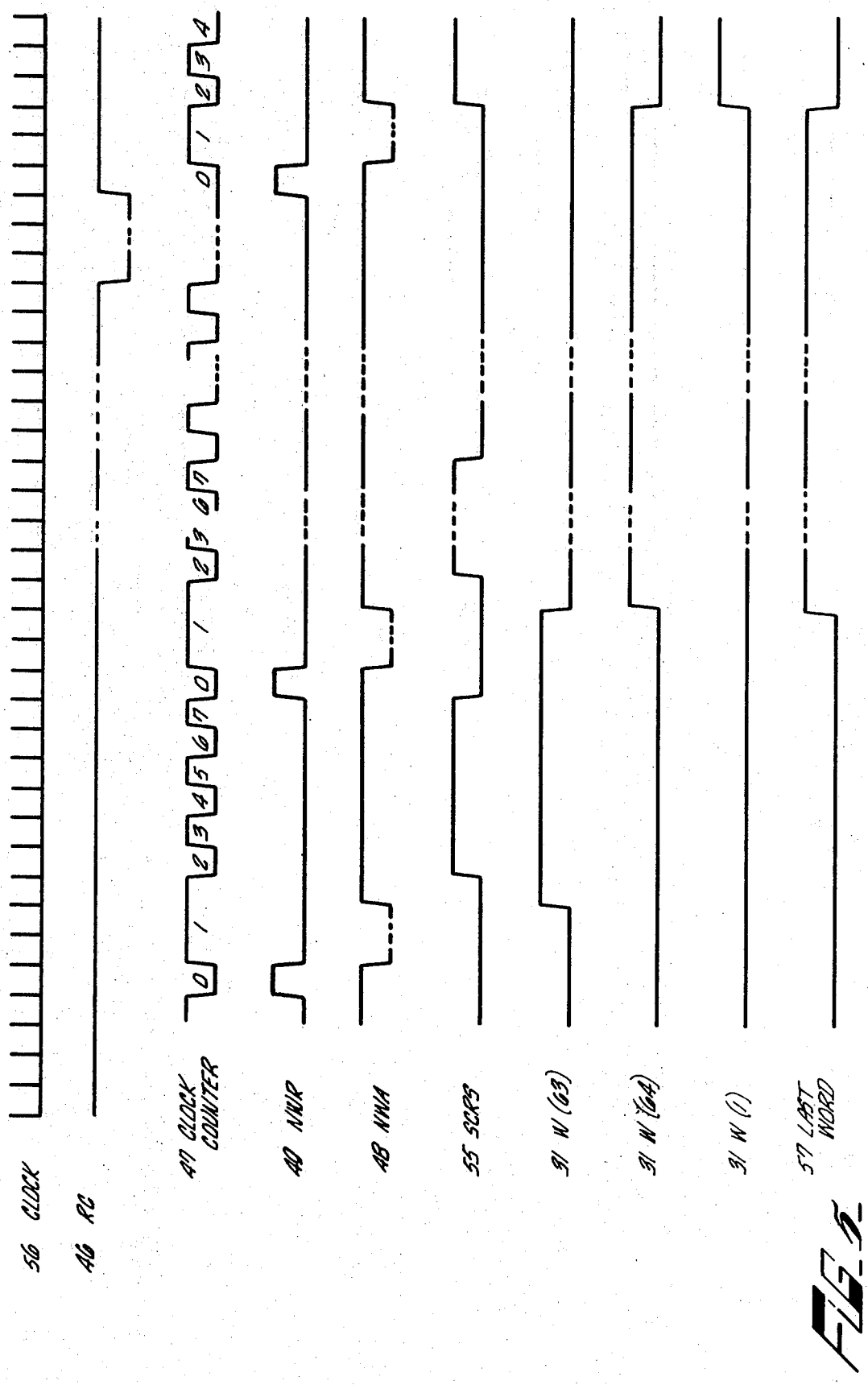

FIG. 6 depicts the time relationship of signals utilized by the present invention during a scan-in operation to alter the status of a single flip-flop circuit. In connection with the signals depicted in FIG. 6, it will be assumed that one of the push buttons 40 is depressed so as to indicate that a scan-in is requested with respect to the scan of the $n$th word during the scan cycle. Signals are shown in FIG. 6 which indicate the presence on lines 31–1 through 31–6 of signals indicative of the storage in address register 13 of the address of this $n$th word as well as signals corresponding to the previous two words and to the next two succeeding words. Additionally, FIG. 6 depicts states manifested by the clock counter within timing and control circuitry 47, and also depicts the "next word request" signals presented on line 49 and the "next word available" signals presented on line 48.

FIG. 6 also depicts the scan-in control signal presented on line 60 and the bit reset signal presented on line 64. Such signals are presented on these lines one clock period after the presentation on lines 31–1 through 31–6 of signals indicative of the particular $n$th word. These signals are presented on line 60 and 64 until the commencement of a new sequence of states by the clock counter 47 and the simultaneous presentation of a signal on line 49 requesting scan of the next word. The signal on line 64 coincident with that on line 60 indicates that, with respect to the particular operation depicted, the designated flip-flop circuit will be reset. As described previously this bit reset operation is effected by depression of bit reset push button 41. If the designated flip-flop circuit is to be set rather than reset, push button 41 is not depressed and no signal appears on line 64.

FIG. 7 depicts the relationship between signals utilized in the present invention during scan-in operations in which entire words are reset. In connection with the signals shown in FIG. 7, the words $WX_n$, $WX_{n+1}$ ... $W'X_{n-1}$, $W'X_n$ are to be reset as the result of depression of one of the register reset push buttons. FIG. 7 depicts signals presented on lines 31–1 through 31–6 indicative of the words to be reset and also the immediately preceeding and the immediately succeeding word. FIG. 7 shows that a signal is presented on line 55 enabling a scan-out operation when the lines 31–1 through 31–6 present signals indicative of the word preceding the words to be reset and when they present signals indicative of the word succeeding the words to be reset. Such signals on line 55 are inhibited, Accordingly, it is to be understood that various and numerous other arrangements may be devised by one skilled in the art without departing from the spirit and scope of this invention.

What is claimed is:

1. In a digital data processing system having a plurality of logical elements arranged in word groups to store a plurality of words, each word group comprising a predetermined number of elements, a display unit comprising:
   a plurality of display lamps arranged in a plurality of word groups corresponding to the logical element word groups, the display lamps bearing a one-to-one relationship with the logical elements; each display lamp being capable of assuming a first and a second binary condition, at least one of which is distinguishable to human sensory perception;
   means for providing signals indicative of the status of logical elements in a particular word group and indicative of the particular word group; and
   silicon controlled rectifiers, each rectifier being serially connected to an associated lamp, and responsive to the signals for triggering to their first condition only those display lamps associated with those logical elements in the particular word group which exhibit a first logical state.

2. In a digital data processing system a display unit according to claim 1 further comprising means for periodically setting all of the lamps to their second condition.

3. In a digital data processing system a display unit according to claim 1 in which the signal providing means comprises means for sequentially scanning each of the word groups of logical elements and for presenting signals on address lines indicative of the word group scanned and on data lines indicative of the status of elements in respective bit positions within the word group scanned.

4. In a digital data processing system having a plurality of logical elements arranged in word groups to store a plurality of words, each word group comprising a predetermined number of elements, a display unit comprising:
   a plurality of display elements arranged in a plurality of word groups corresponding to the logical element word groups, the display elements bearing a one-to-one relationship with the logical elements; each display element being capable of assuming a first and a second binary condition, at least one of which is distinguishable to human sensory perception;
   means for providing signals indicative of the status of logical elements in a particular word group and indicative of the particular word including means for sequentially scanning each of the word groups of logical elements and for presenting signals on address lines indicative of the word group scanned and on data lines indicative of the status of elements in respective bit positions within the word group scanned;
   trigger elements responsive to the signals for triggering to their first condition only those display elements associated with those logical elements in the particular word group which exhibit a first logical state;
   a plurality of bit switch elements, each switch element being associated with a repective one of the display elements, each bit switch being selectively closable to indicate that the status of the logical element associated therewith is to be changed; and means responsive to the closing of a switch element for presenting bit location signals to the system indicative of the bit position within its associated word group of the closed switch.

5. In a digital data processing system a display unit according to claim 4 further comprising means, responsive to the closure of any of the bit switch elements and to the signals presented on the address lines, for presenting a control signal to the system whenever the word group associated with a closed bit switch element is being scanned.

6. In a digital data processing system, a display unit according to claim 5 further comprising a status switch element, the status switch element being selectively closable to present a signal to the system indicative of the binary state to which the logical element associated with a closed switch element is to be changed.

7. In a digital data processing system, a display unit according to claim 6 further comprising a word switch element, the word switch element being selectively closable to indicate that all of the logical elements in a particular one or more words are to be cleared; and in the means responsive to closure of the bit switch elements is also responsive to closure of the word switch element to present a control signal to the system whenever any of the word group associated with the word switch element is being scanned.

8. In a digital data processing system a display unit according to claim 7 in which the bit switch elements, status switch element, and word switch element all comprise manually depressable push buttons.

9. In a digital data processing system having a plurality of logic elements arranged in word groups to store a plurality of words and in a plurality of bit positions within each word group and having means for sequentially scanning each of the word groups and presenting signals on address lines indicative of the word group scanned and on data lines indicative of the status of elements in respective bit positions within the word group scanned, a display unit comprising:
   a plurality of electric lamps arranged in rows and columns, the columns corresponding to the logic element word groups and the rows corresponding to bit positions within the word groups;
   a plurality of silicon controlled rectifiers each having either its cathode or anode serially connected to an associated one of the lamps,
   means responsive to the signals for providing a word signal to each silicon controlled rectifier of the word group being scanned and for providing bit signals to the silicon controlled rectifier in each row corresponding to the bit positions of elements in the scanned word group which are in a first logical state; and
   means for turning "on" each electric lamp connected to a trigger element to which both a word signal and a bit signal are presented.

10. In a digital data processing system a display unit according to claim 9 in which the means for turning "on" the lamps further comprises means for maintaining lamps in an "on" condition subsequent to the termination of word and bit signals on their associated trigger elements.

11. In a digital data processing system a display unit according to claim 9 further comprising means for periodically turning "off" all of the lamps.

12. In a digital data processing system a display unit according to claim 9 in which a two-input AND gate is connected via its output terminal to the gate terminal of each silicon controlled rectifier;
   the signal responsive means provides a word signal on one input terminal of each gate of the word group being scanned and a bit signal on the other input terminal of those gates in each row which correspond to the bit positions of elements in the scanned row which are in a first logical state; and
   each silicon controlled rectifier is triggered by the coincident application of word group and bit signals to its associated gate.

13. In a digital data processing system a display unit according to claim 9 in which the signal responsive means provides a word signal on the cathode of each silicon controlled rectifier associated with the word group being scanned and provides a bit signal on the gate terminal of each silicon controlled rectifier in rows corresponding to the bit positions of elements in the scanned row which are in a first logical state, each silicon controlled rectifier being triggered by the coincident application of word group and bit signals to the rectifier.

14. In a digital data processing system having a plurality of logic elements arranged in word groups to store a plurality of words and in a plurality of bit positions within each word group and having means for sequentially scanning each of the word groups and presenting signals on address lines indicative of the word group scanned and on data lines indicative of the status of elements in respective bit positions within the word group scanned, a display unit comprising:

a plurality of electric lamps arranged in rows and columns, the columns corresponding to the logic element word groups and the rows corresponding to bit positions within the word groups;

a plurality of silicon controlled rectifiers, each silicon controlled rectifier having either its anode or cathode serially connected to an associated one of the lamps;

means responsive to the signals for providing a word signal to each silicon controlled rectifier of the word group being scanned and for providing bit signals to the silicon controlled rectifiers in each row corresponding to the bit positions of elements in the scanned word group which are in a first logical state;

means for turning "on" each electric lamp connected to a trigger element to which both a word signal and a bit signal are presented;

means for maintaining lamps in an "on" condition subsequent to the termination of word and bit signals on their associated silicon controlled rectifiers comprising means for presenting a difference in potential across each pair of serially connected lamps and silicon controlled rectifiers, the potential difference being sufficient to maintain conduction in previously triggered pairs but insufficient to effect conduction in previously untriggered pairs;

means for periodically turning "off" all of the lamps; and a two-input AND gate connected via its output terminal to the gate terminal of each silicon controlled rectifier; and wherein:

the signal responsive means provides a word signal on one input terminal of each gate of the word group being scanned and a bit signal on the other input terminal of those gates in each row which correspond to the bit positions of elements in the scanned row which are in a first logical state; and each silicon controlled rectifier is triggered by the coincident application of word group and bit signals to its associated gate.

15. In a digital data processing system having a plurality of logic elements arranged in word groups to store a plurality of words and in a plurality of bit positions within each word group and having means for sequentially scanning each of the word groups and presenting signals on address lines indicative of the word group scanned and on data lines indicative of the status of elements in respective bit positions within the word group scanned, a display unit comprising:

a plurality of electric lamps arranged in rows and columns, the columns corresponding to the logic element word groups and the rows corresponding to bit positions within the word groups;

a plurality of silicon controlled rectifiers, each silicon controlled rectifier having either its anode or cathode serially connected to an associated one of the lamps;

means responsive to the signals for providing a word signal to each silicon controlled rectifier of the word group being scanned and for providing bit signals to the silicon controlled rectifiers in each row corresponding to the bit positions of elements in the scanned word group which are in a first logical state;

means for turning "on" each electric lamp connected to a trigger element to which both a word signal and a bit signal are presented, including means for maintaining lamps in an "on" condition subsequent to the termination of word group and bit signals on their associated silicon controlled rectifiers;

means for periodically turning "off" all of the lamps; and timing and control means for periodically presenting a signal to the system indicative of a request for the scan of the next succeeding word group, the system scanning the next word group in response to this signal.

16. In a digital data processing system a display unit according to claim 15 in which the timing and control means provides a synchronizing signal to the signal responsive means a predetermined period of time after each request signal, and in which the signal responsive means provides a word signal to the trigger elements associated with the word group being scanned only upon the application thereto of the synchronizing signal.

17. In a digital data processing system a display unit according to claim 16 further comprising a display freezing means for selectively inhibiting both the periodic turning "off" of all of the lamps and the synchronizing signal.

18. In a digital data processing system having a plurality of logic elements arranged in word groups to store a plurality of words and in a plurality of bit positions within each word group and having means for sequentially scanning each of the word groups and presenting signals on address lines indicative of the word group scanned and on data lines indicative of the status of elements in respective bit positions within the word group scanned, a display unit comprising:

a plurality of electric lamps arranged in rows and columns, the columns corresponding to the logic element word groups and the rows corresponding to bit positions within the word groups;

a plurality of silicon controlled rectifiers, each silicon controlled rectifier having either its anode or cathode serially connected to an associated one of the lamps;

means responsive to the signals for providing a word signal to each silicon controlled rectifier of the word group being scanned and for providing bit signals to the silicon controlled rectifier in each row corresponding to the bit positions of elements in the scanned word group which are in a first logical state;

means for turning "on" each electric lamp connected to a silicon controlled rectifier to which both a word group signal and a bit signal are presented, including means for maintaining lamps in an "on" condition subsequent to the termination of word group and bit signals on their associated silicon controlled rectifiers;

means for periodically turning "off" all of the lamps;

a plurality of bit switch elements, each switch element being associated with a respective one of the lamps, each bit switch being selectively closable to indicate that the status of the logic element associated therewith is to be changed; and means responsive to the closing of a switch element for presenting bit location signals to the system indicative of the bit position within its associated word group of the closed switch.

19. In a digital data processing system a display unit according to claim 18 further comprising means, responsive to the closure of any of the bit switch elements and to the signals presented on the address lines, for presenting a control signal to the system whenever the word group associated with a closed bit switch element is being scanned.

20. In a digital data processing system, a display unit according to claim 19 further comprising a status switch element, the status switch element being selectively closable to present a signal to the system indicative of the binary state to which the logic element associated with a closed switch element is to be changed.

21. In a digital data processing system, a display unit according to claim 20 further comprising a word switch element, the word switch element being selectively closable to indicate that all of the logic elements in a particular one or more word groups are to be cleared; and in which the means responsive to closure of the bit switch elements is also responsive to closure of the word switch element to present a control signal to the system whenever any of the word groups associated with the word switch element is being scanned.

22. In a digital data processing system a display unit according to claim 21 in which the bit switch elements, status switch element, and word switch element all comprise manually depressable push buttons.

23. A digital data processing system comprising:
   a plurality of discrete units, each having a plurality of logic elements arranged in word groups to store a plurality of words and in a plurality of bit positions within each word group;
   a scan-in martix;
   a scan-out matrix;
   switching means for selectively connecting the logic element of any selected one of the discrete units to the scan-in matrix and scan-out matrix;
   control circuitry, utilizing the scan-in matrix and scan-out matrix, for sequentially scanning each of the word groups in the selected unit and for presenting signals on address lines indicative of the word group scanned and on data lines indicative of the status of elements in respective bit positions within the word group scanned; and
   a display unit comprising:
      a plurality of incandescent lamps arranged in rows and columns, the columns corresponding to the logic element word groups and the rows corresponding to bit positions within the word groups;
      a plurality of silicon controlled rectifiers, each rectifier being serially connected to an associated one of the lamps;
      means responsive to the signals for providing a word signal to each rectifier associated with the word group being scanned and for providing bit signals to the rectifiers in each row corresponding to the bit positions of elements in the scanned word group which are in a first logical state, rectifiers having both a word signal and a bit signal applied thereto being triggered to permit the flow of electrical current within the rectifier and its associated lamps; and
      means for effecting current flow within lamps associated with triggered rectifiers, the current being of a value sufficient to cause such lamps to become luminous.

24. A digital data processing system according to claim 23 further comprising means for maintaining lamps in their luminous conditions subsequent to the termination of the word group and bit signals on their associated silicon controlled rectifiers.

25. A digital data processing system according to claim 24 further comprising:
   a plurality of manually depressible push button bit switches, each switch being associated with one of the lamps and indicating upon being depressed that the status of its associated logic element in the selected unit is to be changed;
   means responsive to the depression of a bit switch for presenting bit location signals to the control circuitry indicative of the bit position of the depressed switch;
   a manually depressible push button status switch, the status switch indicating the binary state to which the logic element associated with a depressed bit switch is to be changed;
   means for presenting a signal to the control circuitry indicative of the condition of the status switch; and
   means responsive to the depression of any of the bit switches and to the signals presented on the address lines for presenting a control signal to the control circuitry whenever the word group associated with a depressed bit switch is being scanned;
   the control circuitry being responsive to the bit location signals, status switch signal and control signal to present a signal to the scan-in matrix indicative of the changed status of the designated logic element and to effect a scan-in operation.

26. A digital data processing system according to claim 25 further comprising:
   a manually depressible push button word switch, the word switch indicating upon being depressed that all of the logic elements in a particular one or more word groups within the selected unit are to be cleared;
   means responsive to the depression of the word switch for presenting a "word clear" signal to the control circuitry; and
   means responsive to the depression of the word switch and to the signals presented on the address lines for presenting the control signal to the control circuitry whenever any word group associated with the depressed word switch is scanned;
   the control circuitry being responsive to the "word clear" signal and control signal to present signals to the scan-in matrix indicative of the cleared status of an entire word group and to effect a scan-in operation.

27. In a digital data processing system having a plurality of logic elements arranged in word groups to store a plurality of words and in a plurality of bit positions within each word group and having means for sequentially scanning each of the word groups and presenting signals on address lines indicative of the word group scanned and on data lines indicative of the status of elements in respective bit positions within the word group scanned, a display unit comprising:
   a plurality of electric lamps arranged in rows and columns, the columns corresponding to the logic element word groups and the rows corresponding to bit positions within the word groups;
   a plurality of trigger elements, each trigger element being serially connected to an associated one of the lamps;
   means responsive to the signals for providing a word signal to each trigger element of the word group being scanned and for providing bit signals to the trigger elements in each row corresponding to the bit positions of elements in the scanned word group which are in a first logical state;
   means for turning "on" each electric lamp connected to a trigger element to which both a word signal and a bit signal are presented; and
   timing and control means for periodically presenting a signal to the system indicative of a request for the scan of the next succeeding word group, the system scanning the next word group in response to this signal.

28. In a digital data processing system having a plurality of logic elements arranged in word groups to store a plurality of words and in a plurality of bit positions within each word group and having means for sequentially scanning each of the word groups and presenting signals on address lines indicative of the word group scanned and on data lines indicative of the status of elements in respective bit positions within the word group scanned, a display unit comprising:
   a plurality of electric lamps arranged in rows and columns, the columns corresponding to the logic element word groups and the rows corresponding to bit positions within the word groups;
   a plurality of trigger elements, each trigger element being serially connected to an associated one of the lamps;

means responsive to the signals for providing a word signal to each trigger element of the word group being scanned and for providing bit signals to the trigger elements in each row corresponding to the bit positions of elements in the scanned word group which are in a first logical state; and means for turning "on" each electric lamp connected to a trigger element to which both a word signal and a bit signal are presented; and a plurality of bit switch elements, each switch element being associated with a respective one of the lamps, each bit switch being selectively closable to indicate that the status of the logic element associated therewith is to be changed; and means responsive to the closing of a switch element for presenting bit location signals to the system indicative of the bit position within its associated word of the closed switch.

References Cited

UNITED STATES PATENTS

| | | | |
|---|---|---|---|
| 3,296,608 | 1/1967 | Feitler et al. | 340—172.5 |
| 3,267,262 | 8/1966 | Stuart | 340—172.5 |
| 3,156,815 | 11/1964 | Smeltzer | 340—172.5 |
| 3,045,211 | 7/1962 | Auerbach | 340—172.5 |
| 2,997,704 | 8/1961 | Gordon et al. | 340—172.5 |

GARETH D. SHAW, Primary Examiner